(12) United States Patent
Tanabe et al.

(10) Patent No.: US 6,443,602 B1
(45) Date of Patent: Sep. 3, 2002

(54) VEHICLE HEADLAMP DEVICE

(75) Inventors: Toru Tanabe, Yokohama; Shinji Fukuwa, Machida, both of (JP)

(73) Assignee: Stanley Electric Company, Tokyo (JP)

( * ) Notice: Subject to any disclaimer, the term of this patent is extended or adjusted under 35 U.S.C. 154(b) by 0 days.

(21) Appl. No.: 09/497,811

(22) Filed: Feb. 3, 2000

(30) Foreign Application Priority Data

Mar. 1, 1999 (JP) .......................................... 11-052875

(51) Int. Cl.$^7$ .............................................. F21V 21/28
(52) U.S. Cl. ................... 362/465; 362/464; 362/466; 362/467; 362/276; 315/79; 315/81; 315/82
(58) Field of Search .......................... 362/53, 464, 465, 362/466, 467, 276, 212; 315/79, 82, 81; 340/469, 458, 468

(56) References Cited

U.S. PATENT DOCUMENTS

| | | | | |
|---|---|---|---|---|
| 5,562,336 A | * | 10/1996 | Gotou | 362/276 |
| 5,954,428 A | * | 9/1999 | Eichhorn et al. | 362/465 |
| 6,179,455 B1 | * | 1/2000 | Taniuchi | 362/465 |
| 6,049,171 A | * | 4/2000 | Stam et al. | 315/81 |
| 6,118,371 A | * | 9/2000 | Haddad et al. | 340/458 |

FOREIGN PATENT DOCUMENTS

JP        401074135 A   *   3/1989   ............ B60Q/1/12

* cited by examiner

*Primary Examiner*—Stephen Husar
*Assistant Examiner*—Guiyoung Lee
(74) *Attorney, Agent, or Firm*—Morgan, Lewis & Bockius LLP

(57) ABSTRACT

A vehicle headlamp device 10 can be equipped with a discharge lamp 11, a beam switch device 13 that is used to switch between the high beam and low beam, a light distribution switch device 14 which broadens the horizontal light distribution in the forward direction of the vehicle during cornering, and a lighting device 20 which supplies electric power to the discharge lamp. The light distribution switch device 14 can be controlled such that the horizontal light distribution is broadened in the forward direction when the vehicle speed and steering angle exceed specified values. The lighting device 20 can be controlled such that the electric power supplied to the discharge lamp increases only when the horizontal light distribution is broadened by the light distribution switch device 14.

31 Claims, 9 Drawing Sheets

(A)

(B)

(A)

(B)

CHARACTERISTICS OF ILLUMINATION IN FORWARD DIRECTION CAUSED BY BROADENING (Deg)

(C)

EXAMPLE OF ILLUMINATION IN THE FORWARD DIRECTION IN THE PRESENT INVENTION (D)

EXAMPLE OF ILLUMINATION IN THE FORWARD DIRECTION IN THE PRESENT INVENTION

VEHICLE HEADLAMP DEVICE

This application claims the benefit of Japanese Application No. 11-052875, filed in Japan on Mar. 1, 1999, which is hereby incorporated by reference.

BACKGROUND OF THE INVENTION

1. Field of the Invention

The invention concerns a vehicle lamp system, and more specifically is directed to a vehicle headlamp that uses a discharge lamp and can vary its characteristics depending on the speed and steering angle of the vehicle.

2. Discussion of the Related Art

Conventionally, filament light bulbs have been used as light sources in vehicle headlamp devices. Depending on the light bulb structure, a four-lamp or two-lamp type headlamp device is used.

An example of a four-lamp type headlamp device is shown in FIG. 9. The four-lamp type headlamp device 1 is equipped with light bulbs 2 and 3 which are installed side by side on both sides of the front part of the vehicle (in FIG. 9, only the right-side headlamp device is shown). One of the light bulbs 2 emits a so-called high beam (hereafter referred to as "H beam"), while the other light bulb 3 emits a so-called low beam (hereafter referred to as "L beam"). The respective light bulbs 2 and 3 are accommodated inside a lamp body housing 4, and are lit by electric power supplied by a lighting device (not shown in FIG. 9). Furthermore, the light bulbs 2 and 3 are equipped with respective reflective members 2a and 3a, so that the light emitted by the respective light bulbs 2 and 3 is reflected by the reflective members 2a and 3a, and directed towards the front of the vehicle.

In the headlamp device 1 described above, only the light bulb 3 is lit when in L beam mode, while both of the light bulbs 2 and 3 are lit when in H beam mode. As a result, the H beam that is emitted towards the front of the vehicle has an increased quantity of light relative to the L beam. Accordingly, a driver can discern the increase in the quantity of light and be confident that light quantity in the forward field of vision is sufficient in H beam mode.

In FIG. 10, an example of a two-lamp type headlamp device is shown in which a two-lamp type headlamp device 5 is installed on either side of the front part of a vehicle (only a right side headlamp device 5 is shown in FIG. 10). Each of these headlamp devices 5 is equipped with only a single light bulb 6. The light bulb 6 generally has a double-filament structure equipped with two filaments 6a and 6b for emitting the L beam and H beam, respectively. Furthermore, the light bulb 6 is accommodated inside a lamp body housing 4, and is equipped with a reflective member 6c that directs light towards the front of the vehicle. A lighting device (not shown in FIG. 10) supplies electric power to the lamp.

In the headlamp device 5 as described above, power can be switched to the filament 6a in the light bulb 6 so that an L beam is emitted from the filament 6a. In H beam mode, power is switched to the filament 6b so that an H beam is emitted from the filament 6b.

In the case of a so-called H4 type halogen lamp, which is a lamp commonly used as the light bulb 6, the lamp is constructed so that 55 W of lamp electric power is consumed by the filament 6a in L beam mode, and 60 W of lamp electric power is consumed by the filament 6b in H beam mode, at the rated voltage. As a result, the area illuminated by the H beam is larger than that illuminated by the L beam. Accordingly, the quantity of light in the forward field of vision is detectably increased by the 5 W increase in electric power.

In recent years, discharge lamps such as metal halide lamps, etc., which are advantageous in terms of brightness and longevity, etc., have begun to see practical use as light sources in vehicle headlamp devices in place of conventional halogen light bulbs. In the case of the four-lamp type headlamp device 1, the headlamp can be constructed in the same manner as a headlamp that uses conventional halogen light bulbs, except discharge lamps are used instead of light bulbs 2 and 3, respectively. It is also possible to change only one of the light bulbs 2 or 3 to a discharge lamp. A headlamp that includes a discharge lamp incorporated into the L beam/H beam switching feature also provides similar operator comfort when switching between the H beam and L beam modes as in the case of halogen lamps.

Because discharge lamps are more expensive than halogen light bulbs, the use of discharge lamps in a two-lamp type headlamp device 5 would make it possible to reduce costs as compared to a four-lamp type headlamp device 1. However, discharge lamps emit light by means of an "arc light source", in which it is physically impossible to install two arc light sources, e. g., for H beam and L beam use, inside a single discharge lamp. As shown in FIG. 11, a two-lamp type headlamp device 5 using discharge lamps is conventionally constructed so that L beam/H beam switching is accomplished by moving a portion 8a of a hood 8 to block direct light from the discharge lamp 7, or moving the discharge lamp 7 itself. Specifically, in the case of the L beam, a portion 8a of the hood 8 is extended as shown in FIG. 11(A), so that the light-blocking area is expanded. As a result, the light directed towards a reflective member region 9a which reflects light into the distance is blocked, and light emitted into the distance (and possibly incident to oncoming vehicles) can be avoided. When H beam mode is desired, the portion 8a of the hood 8 is withdrawn as shown in FIG. 11(B), such that the light-blocking area is contracted. As a result, light is directed onto the region 9a of the reflective member 9 and an H beam is emitted into the distance by the reflective member 9. The discharge lamp 7 is typically a 35 W lamp.

In the two-lamp type headlamp device 5 using a discharge lamp 7 constructed as described above, the quantity of light produced in the H beam mode may be insufficient. In order to compensate for this insufficiency in the quantity of light, an auxiliary reflective part 9b is installed outside of region 9a of the reflective member 9, as shown by the dotted line in FIG. 11.

As shown in FIG. 12, light distribution control of lamp illumination in the direction of a vehicle's travel path during cornering is accomplished by distributing a portion of the light beam generated by the headlamp device toward the direction of travel for the vehicle in accordance with the vehicle speed and steering angle. Such light distribution control is accomplished by a reflective member 9 constructed, for example, as shown in FIG. 12. The reflective member 9 is split into two parts (upper and lower) along a horizontal direction. The lower part 9c of the reflective member 9 is fastened in place, while the upper part 9d is pivoted about a rotating shaft 9e. The system is arranged so that a portion of light is distributed in the direction of vehicle travel by pivoting upper part 9d about the rotating shaft 9e in accordance with the steering angle. However, in the case of such light distribution control, the illumination of the forward field of vision drops during cornering as a result of the upper part 9d pivoting so that a portion of the light from the discharge lamp 7 is distributed, thus resulting in an insufficient quantity of light in the forward direction of the vehicle. Furthermore, when light distribution control is used in a two-lamp type headlamp device 5 using a discharge lamp 7, L beam/H beam switching is accomplished by means of the discharge lamp 7 equipped with a single arc light source. Accordingly, it is necessary to equip the reflective member 9 with an auxiliary reflective part 9b in order to compensate for the insufficient quantity of light in H beam. Consequently, the number of parts is increased such that the cost of manufacturing and the overall size of the headlamp device 5 is increased.

In light of the above points, an object of the invention is to provide a vehicle headlamp device which is designed so that the quantity of light in the forward field of vision during cornering and in the H beam mode is acceptable. Another object of the invention is to provide a lamp that has good light quality and is constructed at low cost and by means of a simple construction.

SUMMARY OF THE INVENTION

According to a first aspect of the invention, the above-mentioned objects can be achieved by a vehicle headlamp device including a light source connectable to a front of the vehicle and configured to produce a light beam, means for switching between a high beam and a low beam located adjacent to said light source, means for broadening a horizontal light distribution of said light beam in a direction of travel of the vehicle during cornering, said means for broadening a horizontal light distribution located adjacent said light source, and a lighting device configured to receive a vehicle speed detection signal and a steering angle detection signal, said lighting device controlling electric power to said light source and said means for broadening a horizontal light distribution, such that electric power supplied to said light source increases, and said horizontal light distribution is broadened in the direction of travel of the vehicle, when the vehicle speed detection signal and the steering angle detection signal exceed predetermined values.

According to this aspect of the invention, a larger electric power is supplied to the discharge lamp when the horizontal light distribution is broadened by means for changing light distribution. Accordingly, when the horizontal light distribution is broadened, the discharge lamp is lit by a larger quantity of light, and the quantity of light in the forward field of vision is sufficient to fill the broadened horizontal light distribution. Consequently, good distant visual recognition characteristics are obtained, and a favorable feeling in terms of quantity of light is realized in the forward field of vision.

According to another aspect of the invention, the lighting device increases the electric power in synchronization with operation of the means for broadening a horizontal light distribution.

According to another aspect of the invention, the means for broadening a horizontal light distribution is constructed such that the light distribution is maximally broadened when the steering angle exceeds a predetermined maximum value, and the increase in electric power effected by the lighting device is performed at a constant rate of increase when the steering angle exceeds the predetermined value. In this aspect of the invention, the increase in electric power effected by the lighting device is accomplished using a switching command signal that is sent to the means for changing light distribution when the steering angle exceeds a certain value. Accordingly, the increase in electric power effected by the lighting device is automatically performed as a result of the steering operation of the vehicle operator, so that the operability of the system is improved, and so that the increase in electric power effected by the lighting device is accomplished more reliably.

In accordance with another aspect of the invention, the means for broadening a horizontal light distribution is constructed such that the light distribution is gradually broadened in accordance with the detected steering angle, and the lighting device is configured to control the electric power to gradually increase in accordance with the detected steering angle. In this aspect of the invention, the horizontal light distribution is gradually broadened in accordance with the steering angle. Accordingly, the increase in electric power effected by the lighting device is automatically performed in accordance with the steering angle as a result of the steering operation of the vehicle operator, so that the operability of the system is improved. Furthermore, the increase in the electric power effected by the lighting device can be performed so that an optimal quantity of light can be provided in the forward field of vision to compensate for the broadening of the horizontal light distribution which tends to disperse the light.

According to yet another aspect of the invention, the lighting device returns the electric power to its original value when the detected vehicle speed drops below a predetermined low value. In this aspect of the invention, when the vehicle is stopped, the lighting device reduces the electric power to its original L beam level. As a result, a saving of electric power is realized and consumption of the vehicle battery is reduced. In addition, deterioration of the useful life of the discharge lamp can be prevented.

According to still another aspect of the invention, the lighting device is further controlled so that the electric power supplied to the light source is increased when the light beam is switched to high beam by the means for switching between high beam and low beam. In this aspect of the invention, the discharge lamp is supplied with a larger electric power when the light is switched to the H beam by the means for switching. Accordingly, the discharge lamp is lit by a greater quantity of light when in H beam mode such that the quantity of light in the H beam mode is sufficient and good distant visual recognition characteristics can be obtained.

According to another aspect of the invention, the lighting device includes a microcomputer which increases the electric power of the lighting device based on one of: 1) the detected vehicle speed; 2) the detected steering angle; 3) a beam switching command signal emitted from the means for switching between high and low beam; and 4) a combination of the detected vehicle speed, the detected steering angle and beam switching command signal. In this aspect of the invention, the microcomputer increases the electric power of the lighting device when the steering angle exceeds a certain value, or when the H beam is selected by the means for switching between L beam and H beam, and stops the electric power increase of the lighting device when the vehicle is stopped. As a result, the increase in the electric power effected by the lighting device during cornering or when the H beam is in use can be accomplished using a microcomputer used for common control. Thus, the construction of the headlamp device is simplified, and the cost of the device can be reduced.

According to another aspect of the invention, the increase in electric power effected by the lighting device is approximately a 5% to 20% increase. In this aspect of the invention, the electric power used when in the L beam mode is set at the rated power of the discharge lamp, and electric power is increased by approximately 5% to 20% of the rated power when in the H beam mode. As a result, the L beam and H beam have the highest brightness possible. Furthermore, even when the H beam is in use, the electric power can be maintained within permissible limits relative to the rated power such that deleterious effects on the useful life of the discharge lamp can be minimized. In addition, when the power increase applied during H beam mode is less than 5%, the quantity of light in the forward field of vision may become inadequate. On the other hand, when the power increase exceeds 20%, effects that cause a deterioration in the useful life of the discharge lamp may occur.

According to still another aspect of the invention, the device is constructed as a two-lamp system in which the light source is configured for placement on the right front side of the vehicle and a second left light source is configured for placement on the left front side of the vehicle. In this aspect of the invention, a single discharge lamp can be disposed on each side of a vehicle, and the increase in electric power effected by the lighting device can be performed when the H beam is in use, and during cornering when the L beam is in use. The quantity of light in the forward field of vision is adequate when using such a two-lamp system. During cornering with the H beam in use, the electric power increase of the lighting device has already been performed in accordance with the switching command signal of the means for switching between H beam and L beam. Accordingly, in order to prevent deterioration of the useful life of the discharge lamp, no further increase in electric power is performed when cornering in H beam mode.

According to another aspect of the invention, a first left light source configured for placement on the left front of the vehicle, a second left light source configured for placement on the left front of the vehicle, a second right light source configured for placement on the right front of the vehicle, wherein the light source is configured for placement on the right front of the vehicle and the vehicle headlamp device is constructed as a four-lamp system. In this aspect of the invention, H beam illumination and L beam illumination are accomplished by means of respective single discharge lamps on each side. Electric power supplied to the discharge lamps used in L beam mode is increased during cornering, and electric power supplied to the discharge lamps used in H beam mode is increased when the H beam is in use. Thus, the quantity of light in the forward field of vision is adequate when using the four lamp system.

According to another aspect of the invention, a vehicle headlamp device for connection to a vehicle includes a light source connectable to a front of the vehicle, a vertical light directing structure located adjacent said light source and configured to direct a light beam emitted from said light source in one of a low beam direction in which said light beam is directed away from the front of the vehicle, and a high beam direction in which said light beam is directed away from the front of the vehicle and at a higher vertical angle relative to said low beam direction, a horizontal light directing structure located adjacent said light source and configured to direct a light beam emitted from said light source in one of a normal beam direction in which said light beam is directed away from the front of the vehicle, and a wide beam direction in which said light beam is directed away from the front of the vehicle and at a larger horizontal angle relative to said low beam direction, and a lighting device configured to receive a vehicle steering angle signal and a vehicle speed signal, and to increase electric power to said light source when the vehicle speed signal and steering angle signal exceed predetermined values.

DETAILED DESCRIPTION OF THE PREFERRED EMBODIMENTS

Preferred embodiments of the invention will be described in detail with reference to FIGS. 1 through 7. Because the embodiments described below are preferred concrete examples of the invention, the scope of the invention should not be considered to be limited by these configurations.

Figure 1:
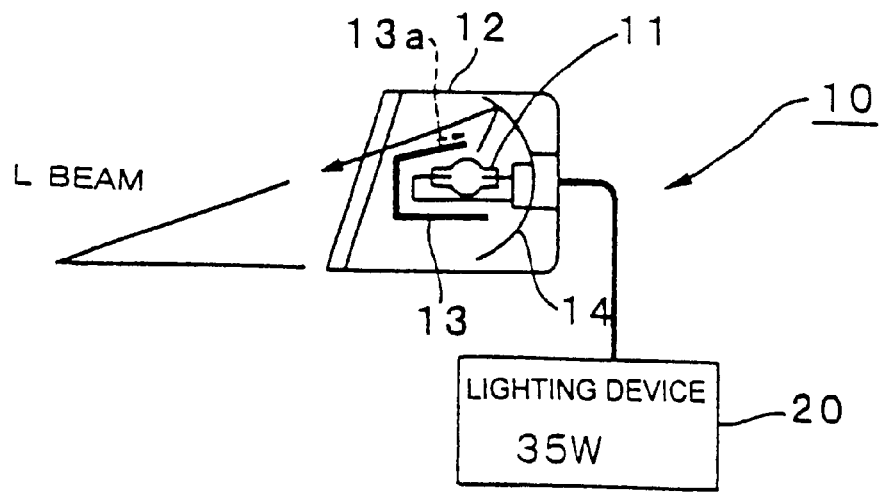
FIG. 1 is a schematic side view of an embodiment of the vehicle lamp in L beam mode made in accordance with the principles of the invention.
Figure 2:
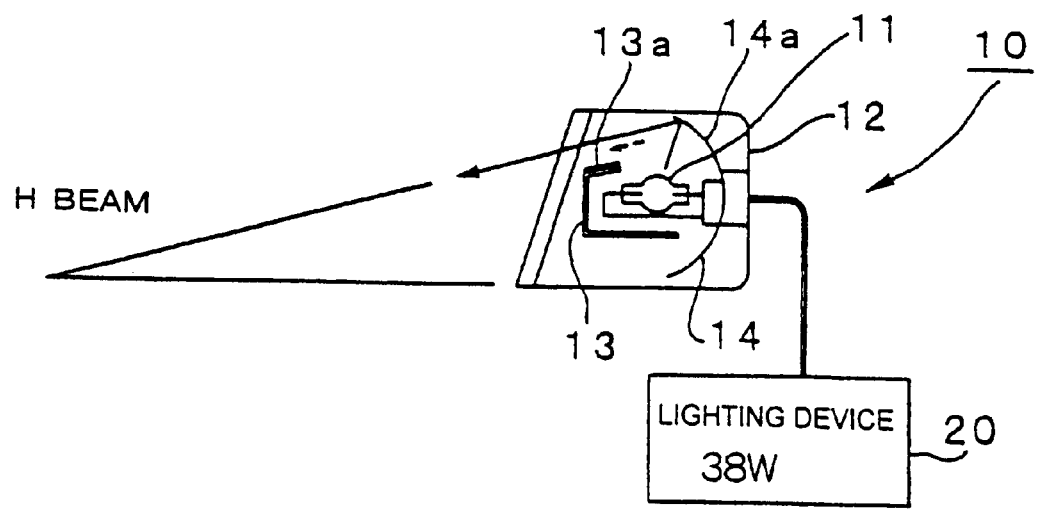
FIG. 2 is a schematic side view of the vehicle headlamp device of FIG. 1 in H beam mode.
Figure 3:
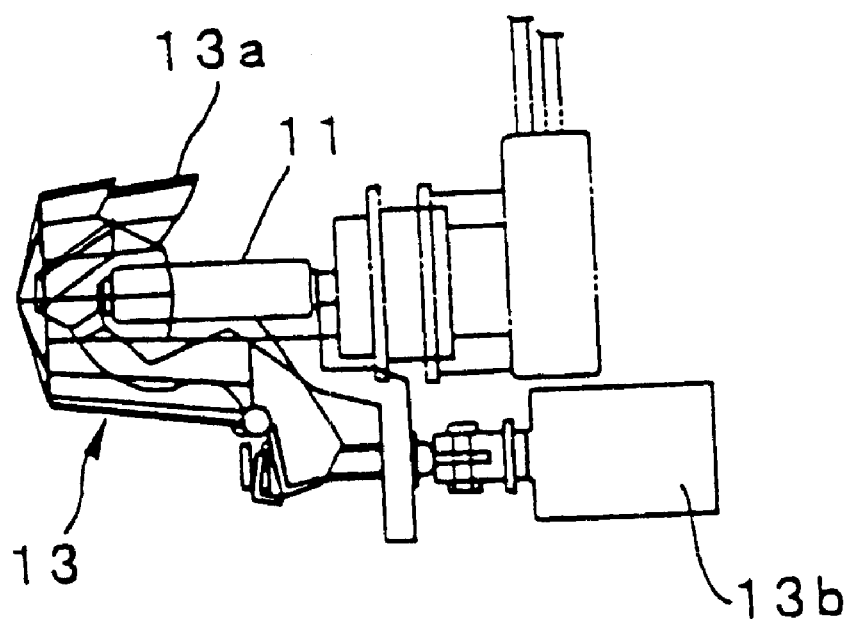
FIG. 3 is a schematic sectional view of a detailed construction of the hood in the vehicle headlamp device shown in FIG. 1.
Figure 4:
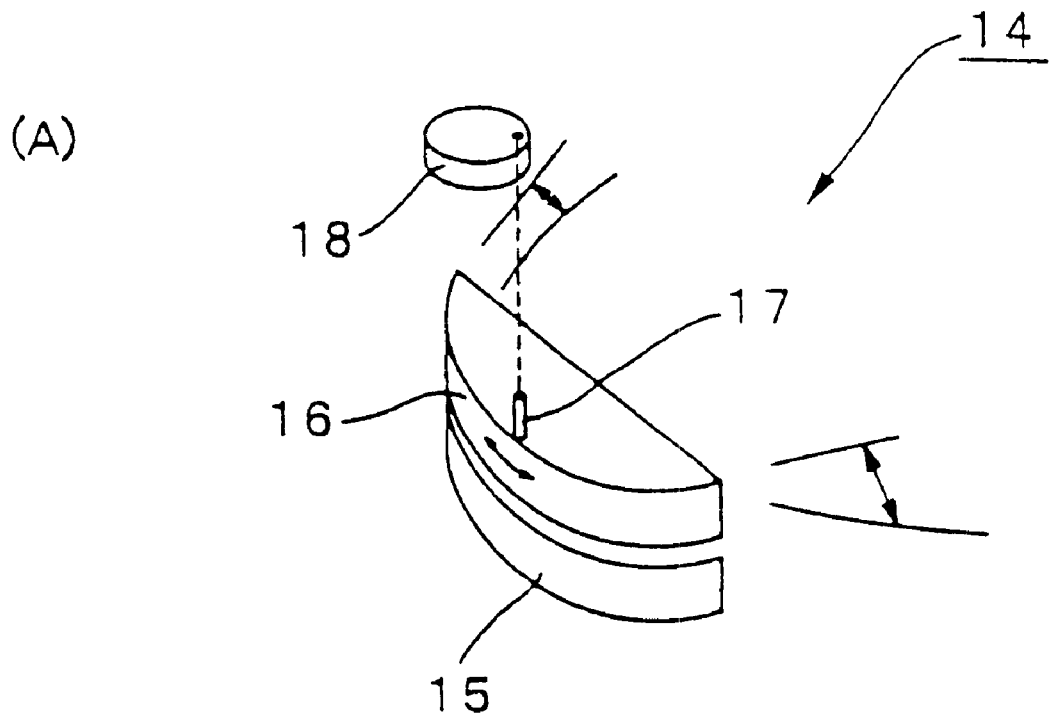
FIGS. 4A–B are a schematic perspective view and an enlarged partial view of the reflective member of the vehicle headlamp device shown in FIG. 1.
Figure 4:
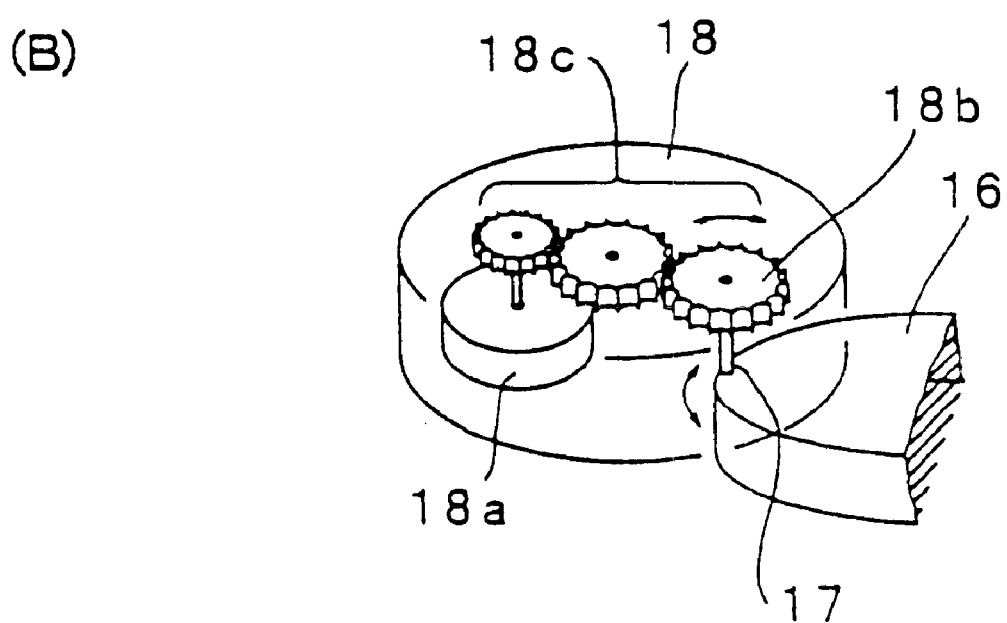

FIGS. 1 and 2 show the construction of a preferred embodiment of a two-lamp type vehicle headlamp device constructed according to the invention. As shown in FIGS. 1 and 2, a vehicle headlamp device 10 can be equipped with a single discharge lamp 11 used as light source. The headlamp device 10 can includes lamps installed on either side of the front part of a vehicle (in FIGS. 1 and 2, a headlamp device lamp on only one side is shown). The discharge lamp 11 can include a conventional arc light source in which light is emitted as a result of the discharge of the arc light source on the basis of electric power supplied from a lighting device (to be described later). Furthermore, the discharge lamp 11 can be accommodated inside a lamp body housing 12, and equipped with a hood 13 used as a means for switching between the H beam mode and the L beam mode. A reflective member 14 can be used for reflecting the light discharged from the lamp 11 towards the front of the vehicle. A lighting device 20 can provide electrical power to the lamp.

Preferably, a metal halide lamp is used as the discharge lamp 11. However, other types of lamps may also be used, including LED's, incandescent light sources, other arc type discharge light sources, filament light sources, florescent light sources, etc. As is shown in detail in FIG. 3, a hood 13 can include a portion 13a that is movable to selectively block light emitted from the light source. A portion 13a of the hood 13 can be constructed as a movable hood, while the remainder of the hood 13 is constructed as a fixed hood formed in a concave manner with respect to the discharge lamp 11. The movable hood portion 13a can be moved in the forward-backward direction by a solenoid 13b. The solenoid 13b can be driven by switching command signals from the L beam/H beam switch. When the vehicle lamp is in the L beam mode, the portion 13a of the hood 13 can be extended by the solenoid 13b as shown in FIG. 1, so that the light-blocking area is expanded. As a result, light directed towards a reflective member region 14a, which is configured to reflect light into the distance, is blocked such that light emitted in the distance and possibly incident to oncoming vehicles is blocked. Moreover, the vertical angle of light emitted from the lamp device is restrained within a predetermined L beam angle when in the L beam mode.

When the vehicle lamp is in the H beam mode, the portion 13a of the hood 13 can be retracted by the solenoid 13b as shown in FIG. 2 such that the light-blocking area contracts. As a result, light is directed onto region 14a of the reflective member 14 such that an H beam is emitted into the distance by the reflective member 14. The vertical angle of light emitted from the lamp device in H beam mode is thus wider than that emitted from the lamp device in L beam mode.

As shown in FIG. 4A, the reflective member 14 can be split into two parts (upper and lower) along a horizontal direction. The lower part 15 can be fixed, while the upper part 16 is pivoted about a rotating shaft 17. The rotating shaft 17 can be arranged so that it is rotationally driven by a driving device 18 which, as shown in FIG. 4B can include a driving motor 18a, a driving gear 18b attached to the rotating shaft 17, and a driving gear train 18c which transmits the rotation of the driving motor 18a to the driving gear 18b. The upper part 16 of the reflective member 14 can pivot through a specified angular range by action of the driving device 18, as indicated by the arrow in FIG. 4A. Accordingly, a portion of the light emitted by the discharge lamp 11 can be reflected by the lower part 15 of the reflective member 14 in a straight, forward direction while a remainder of light is reflected by the upper part 16 in a direction corresponding to a turning direction of the vehicle, e.g., forward when the vehicle is stopped, and in the direction of travel for the vehicle when cornering.

Figure 5:
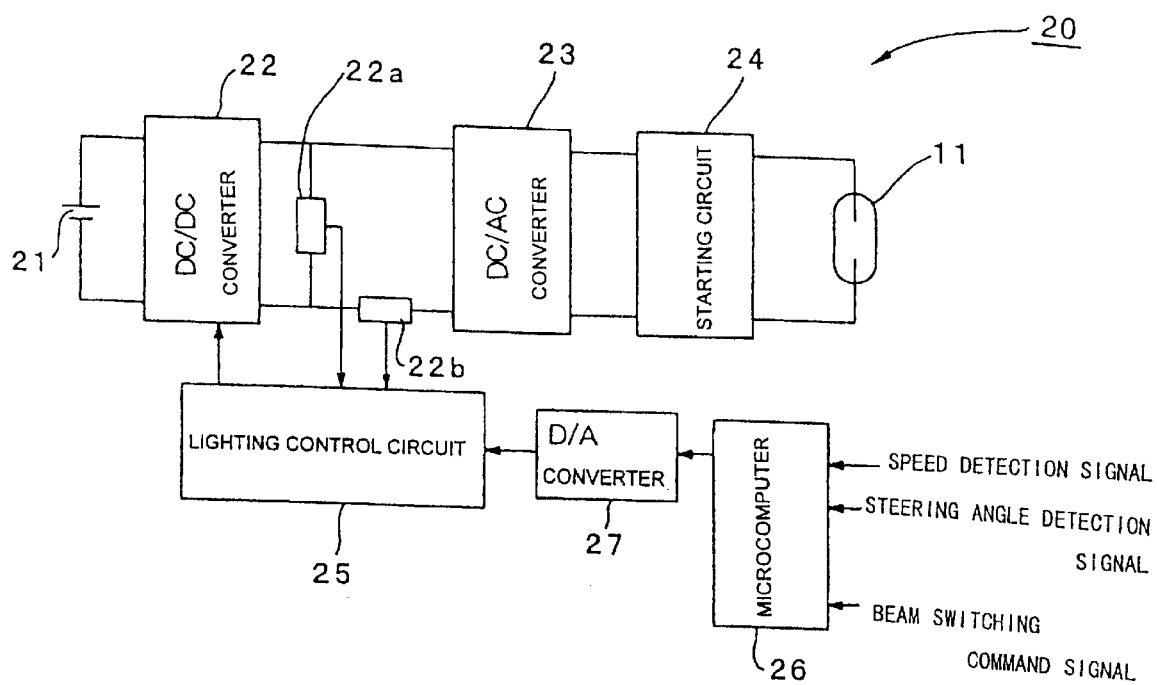
FIG. 5 is a block diagram which illustrates an example of the construction of the lighting device in the vehicle headlamp device shown in FIG. 1.

As shown in FIG. 5, the lighting device 20 can include a DC/DC converter 22 connected to the battery 21 of the vehicle, a DC/AC converter 23, a starting circuit 24 connected to the discharge lamp 11, and a lighting control circuit 25. The DC/DC converter 22 can have a conventional construction and is used to step up the direct current from the battery 21. The DC/AC converter 23 can also have a conventional construction and is used to convert the direct current from the DC/DC converter 22 into an alternating current. The starting circuit 24 generates a high-voltage pulse which is used to initiate the lighting of the discharge lamp 11 and, after lighting, supplies AC electric power (supplied from the DC/AC converter 23) to the discharge lamp 11. The lighting control circuit 25 performs (for example) PWM control of the DC/DC converter 22 on the basis of the voltage and current values from a voltage detection part 22a that detects the output voltage of the DC/DC converter 22, and a current detection part 22b that detects the output current of the DC/DC converter 22, so that an appropriate electric power is supplied to the discharge lamp 11.

The lighting device 20 can be constructed such that control signals are input into the lighting control circuit 25 from a microcomputer 26 via a D/A converter 27. The microcomputer 26 inputs: a steering angle detection signal from a steering angle detection part (not shown in the drawings); a vehicle speed detection signal from a vehicle speed detection part (not shown in the drawings); and, a beam switching command signal from an L beam/H beam switch (not shown in the drawings), respectively. Furthermore, based on the steering angle detection signal, vehicle speed detection signal and beam switching command signal, the microcomputer 26 can perform the following actions: 1) when both the steering angle detection signal and vehicle speed detection signal exceed a specified value, the microcomputer 26 outputs an H level light distribution switching control signal; 2) when either of the steering angle detection signal and vehicle speed detection signal is below a specified value, the microcomputer 26 outputs an L level light distribution switching control signal; and 3) when the beam switching command signal produces either an H beam signal or a L beam signal, the microcomputer 26 outputs an H level switching control signal when the H beam signal is in use, and an L level switching control signal when the L beam signal is in use. The respective switching control signals are subject to digital/analog conversion by the D/A converter 27, and are input into the lighting control circuit 25.

The microcomputer 26 is initialized when the ignition switch of the vehicle (not shown in the drawings) is switched on. In response, when an H level light distribution switching control signal is input, the lighting control circuit 25 controls the DC/DC converter 22 so that the electric power supplied to the discharge lamp 11 is increased by approximately 5%–20%. When the vehicle speed drops below a specified value, or when the steering angle drops below a specified value, the light distribution switching control signal is switched to the L level. Accordingly, the lighting control circuit 25 controls the DC/DC converter 22 so that the electric power supplied to the discharge lamp 11 is returned to the original electric power. However, if an H level beam switching control signal is being input from the microcomputer 26, the lighting control circuit 25 controls the DC/DC converter 22 so that the electric power supplied to the discharge lamp 11 is increased by 5%–20% and the light is in H beam mode. Conversely, when an L level beam switching control signal is received from the microcomputer 26, the lighting control circuit 25 controls the DC/DC converter 22 so that the electric power supplied to the discharge lamp 11 is maintained at the lower, original electric power.

Specifically, when the vehicle is traveling straight forward or when the L beam is in use, the lighting control circuit 25 supplies 35 W of electric power to the discharge lamp 11. However, when an H level beam switching control signal is received from the microcomputer 26, or when an H level light distribution switching control signal is received, the lighting control circuit 25 controls the DC/DC converter 22 so that the electric power supplied to the discharge lamp 11 is increased to 38 W. Thus, the lighting control circuit 25 increases the electric power supplied to the discharge lamp 11 to 38 W only during cornering or when the H beam is switched on.

Figure 6:
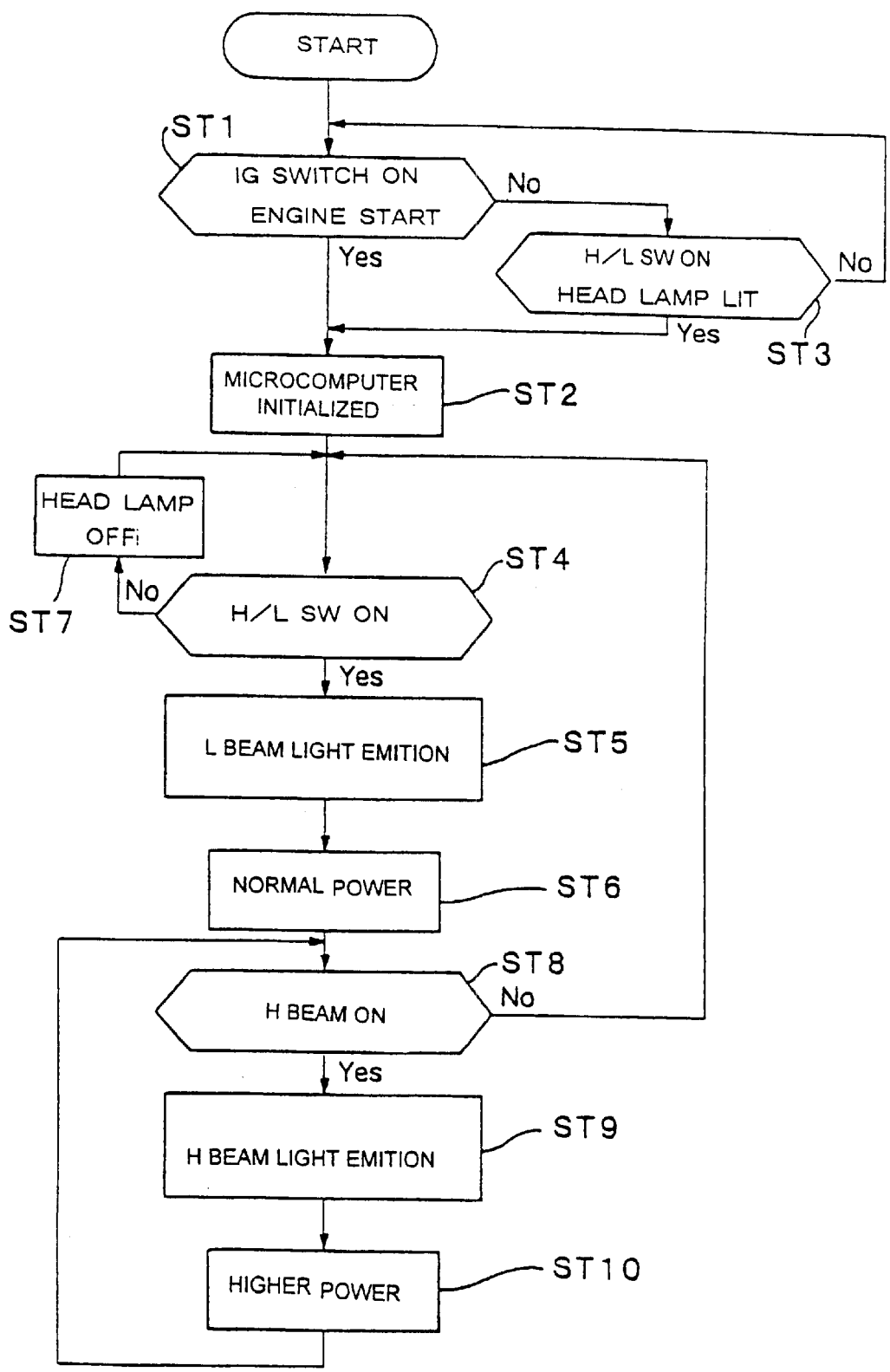
FIG. 6 is a flow chart which illustrates the beam switching operation of the vehicle headlamp device shown in FIG. 1.

With regard to beam switching, the vehicle headlamp device 10 can operate as follows in accordance with the flow chart shown in FIG. 6. First, when the ignition switch of the vehicle is switched on so that the engine is started in step ST1, the microcomputer 26 is initialized in step ST2. When the ignition switch is off in step ST1, the on-off state of the headlamp switch is ascertained in step ST3 and, if the headlamp switch is on, the headlamp is lit, and the microcomputer 26 is initialized in step ST2. When the headlamp switch is off in step ST3, the processing returns to step ST1.

Following the initialization of the microcomputer 26 in step ST2, the on-off state of the headlamp switch is determined in step ST4. When the headlamp switch is on, the solenoid 13b of the hood 13 is driven and controlled in step ST5 so that the movable hood 13a is moved to the extended position to provide an L beam light emission. Then, in step ST6, the lighting control circuit 25 supplies the rated electric power to the discharge lamp 11. As a result, the discharge lamp 11 is lit by the rated electric power (preferably 35 W). Light from the discharge lamp 11 is blocked by the movable hood 13a in the extended position in the L beam mode, and the remainder of unblocked light is reflected by the reflective member 14 so that the light is emitted forward as an L beam. When the headlamp switch is off in step ST4, the lighting control circuit 25 does not supply electric power to the discharge lamp 11 as shown in step ST7. Accordingly, the discharge lamp 11 is not lit and processing returns to step ST4.

Next, when the vehicle beam switching switch is switched on and the beam is switched to the H beam in step ST8 while the L beam is being emitted in step ST6, the solenoid 13b of the hood 13 is driven and controlled in step ST9 so that the movable hood 13a is moved to the retracted position in order to achieve H beam light emission. Then, in step ST10, the lighting control circuit 25 supplies an electric power which is greater than the rated electric power, e. g., an electric power of 38 W, to the discharge lamp 11. As a result, the discharge lamp 11 is lit at a higher brightness and the light from the discharge lamp 11 is incident on the region 14a of the reflective member 14 because the movable hood 13a is in its retracted position. Thus, the light is emitted in the forward direction as an H beam and processing returns to step ST8.

When the illuminated area of the forward field of vision is expanded and the light is in the H beam mode, the lighting control circuit 25 supplies an electric power larger than the rated electric power to the discharge lamp 11. Accordingly, the discharge lamp 11 emits light more brightly such that quantity of light is not deteriorated by the expansion of the illuminated area. Thus, when using the H beam, good distant visual recognition characteristics are obtained, and an operator can be comfortable with the quantity of light in the forward field of vision.

When the rated electric power is 35 W, the discharge lamp 11 has an electric power range of 30 W to 38 W in accordance with European standards. Because the utilization rate of the H beam in use is relatively low, there is little deterioration of the useful life even when the lamp is lit by an electric power of 38 W.

When the beam switching switch of the vehicle is switched off in step ST7 so that the light beam is switched to the L beam, processing returns to step ST4, and the on-off state of the headlamp switch is determined again. When the headlamp switch is on, the L beam is again emitted at the rated electric power (preferably 35W) in step ST5 and step ST6.

Figure 7:
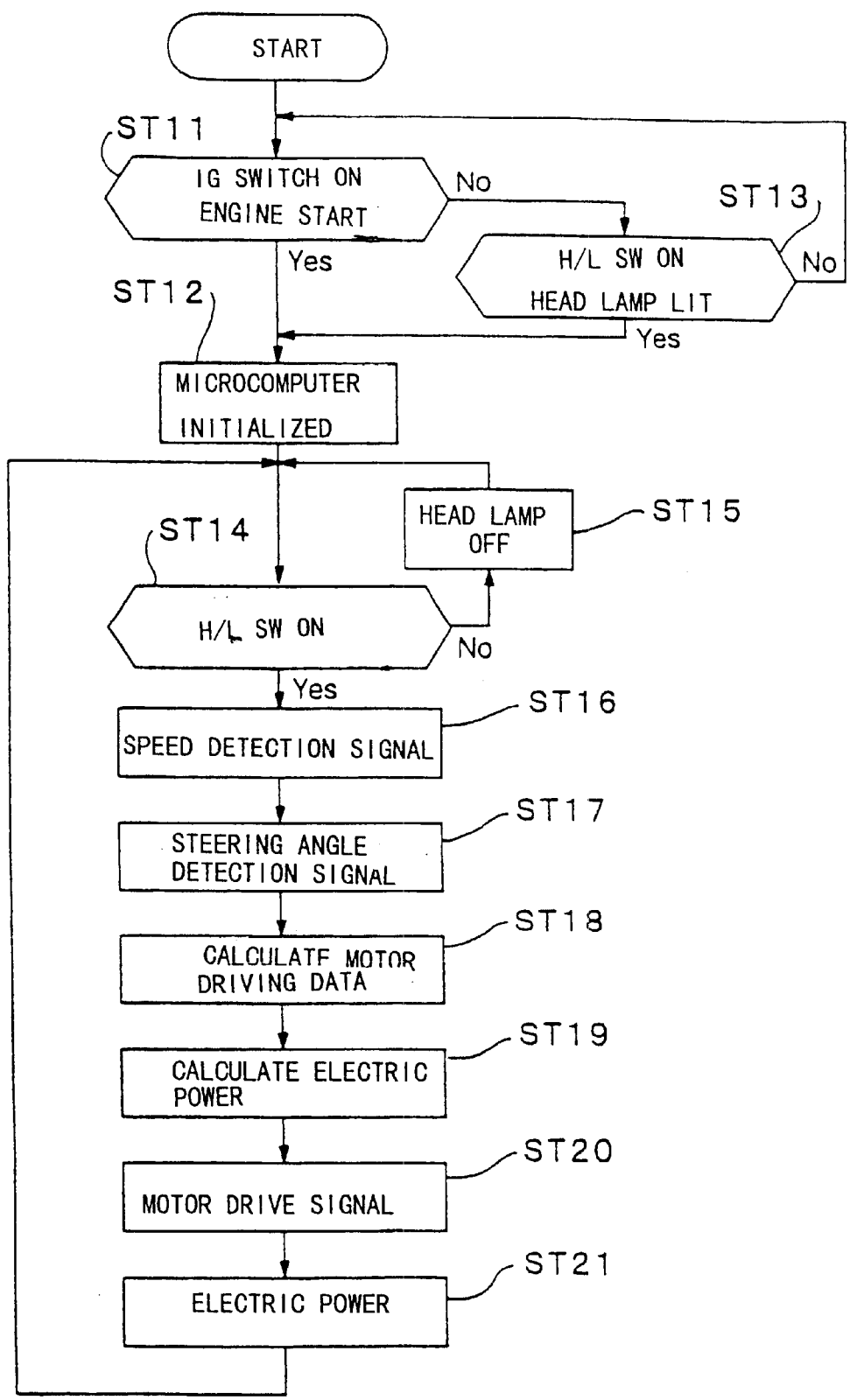
FIG. 7 is a flow chart which illustrates the light distribution switching operation of the vehicle headlamp device shown in FIG. 1.

As shown in FIG. 7, light distribution switching operates according to the flow chart as follows. First, when the ignition switch of the vehicle is switched on such that the engine is started in step ST11, the microcomputer 26 is initialized in step ST12. If the ignition switch is off in step ST11, the on-off state of the headlamp switch is determined in step ST13. When the headlamp switch is on, the headlamp is lit, and the microcomputer 26 is initialized in step ST12. However, when the headlamp switch is off in step ST13, the processing returns to step ST11.

Following the initialization of the microcomputer 26 in step ST12, the on-off state of the headlamp switch is determined in step ST14. When the headlamp switch is off, the lighting control circuit 25 does not supply electric power to the discharge lamp 11 in step ST15, the discharge lamp 11 is not lit, and processing returns to step ST14. When the headlamp switch is on, a vehicle speed detection signal is input into the microcomputer in step ST16, and a steering angle detection signal is input into the microcomputer 26 in step ST17. As a result, in step ST18, the microcomputer 26 calculates the desired rotational angle of the upper part 16 of the reflective member 14 (i.e., desired driving data for the driving motor 18a of the driving device 18), on the basis of the steering angle detection signal. The microcomputer 26 also calculates the electric power supplied to the discharge lamp 11 on the basis of the vehicle speed detection signal and steering angle detection signal. The electric power supplied to the light is ordinarily the rated electric power. However, when both the vehicle speed and steering angle exceed prescribed values, the electric power is set at a value greater than the rated electric power. When the electric power has already been increased during use of the H beam, a power increase is preferably not performed in step ST19, in order to prevent deterioration of the useful life of the discharge lamp 11 due to a redoubled power increase.

Next, in step ST20, the microcomputer 26 drives and controls the driving motor 18a of the driving device 18 of the reflective member 14 on the basis of the driving data calculated in step ST18. As a result, the upper part 16 of the reflective member 14 is caused to pivot about the rotating shaft so that light from the discharge lamp 11 is reflected and emitted in the direction of the front wheels Tf in accordance with the steering angle as shown, for example, in FIG. 8A. In step ST21, the microcomputer 26 controls the lighting control circuit 25 on the basis of the electric power set in step ST19. Accordingly, the lighting control circuit 25 ordinarily supplies the rated electric power (preferably, 35 W) to the discharge lamp 11. However, when the vehicle speed and steering angle exceed specified values, an electric power which is larger than the rated electric power, e. g., an electric power of 38 W, is supplied to the discharge lamp 11.

Figure 8:
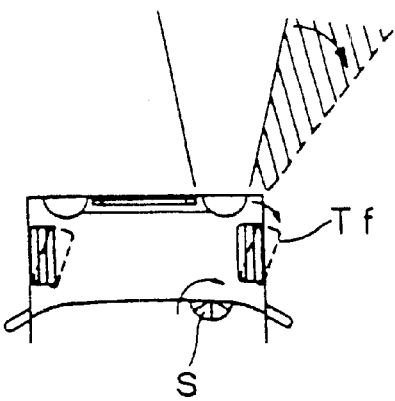
FIGS. 8A–D are A) a schematic top view of a vehicle in which a headlamp of FIG. 1 is installed, and three graphs which illustrate the relationship between the broadening angle of the horizontal light distribution and B) the percentage of illumination in the forward direction, C) the percentage of electric power, and D) the percentage of illumination in the forward direction with power increase.
Figure 8:
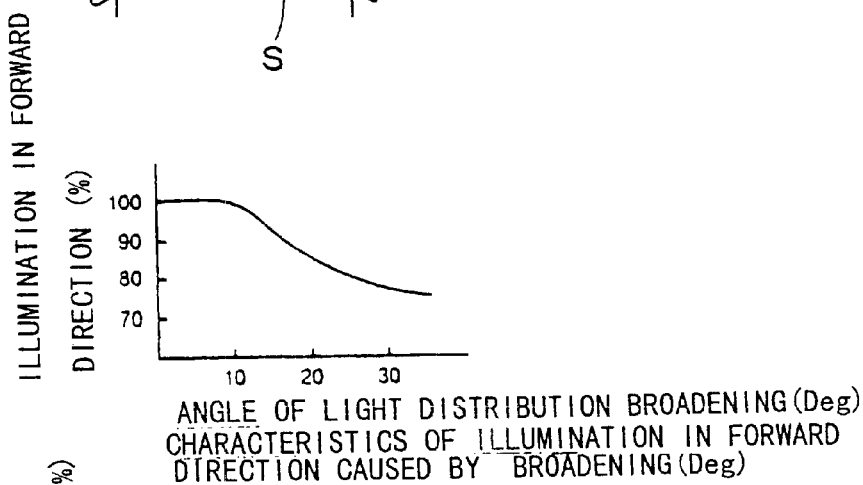
Figure 8:
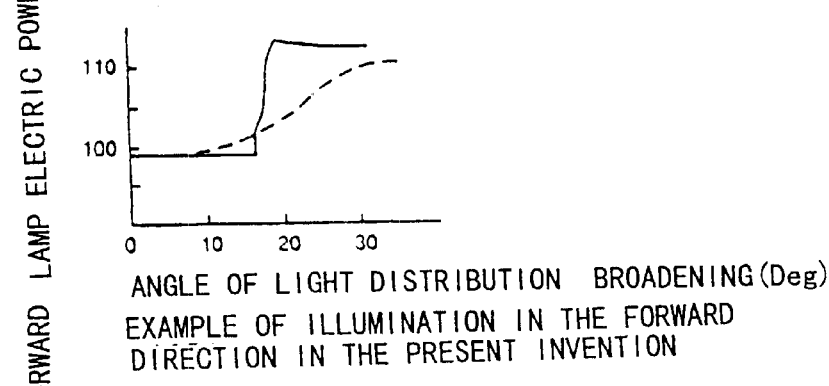
Figure 8:
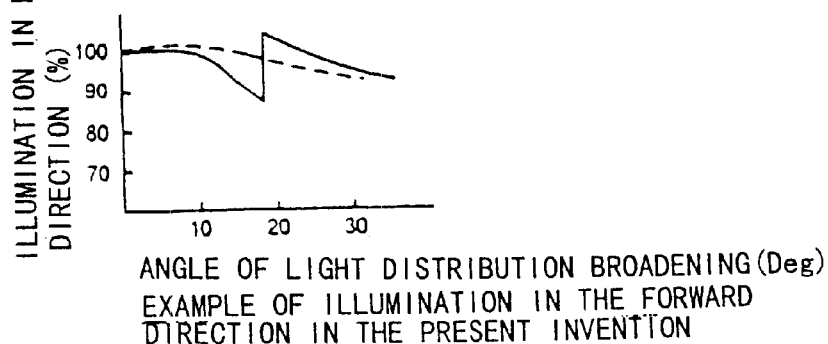
Figure 9:
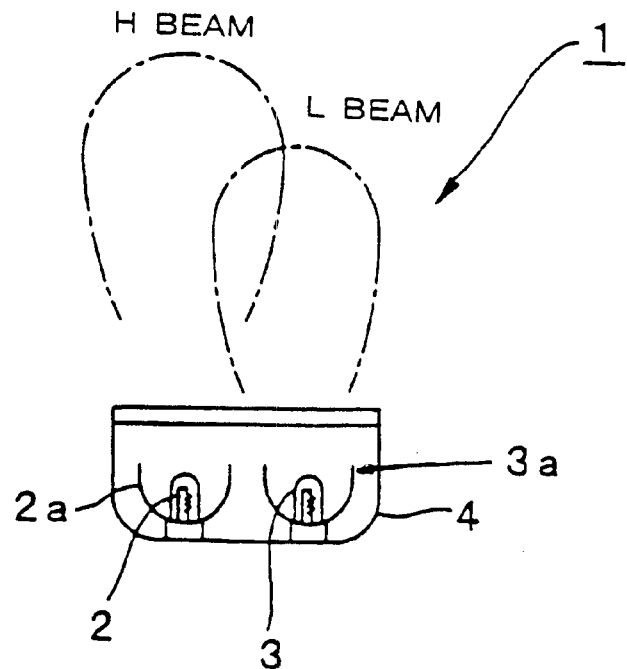
FIG. 9 is a schematic top view of a conventional four-lamp type vehicle headlamp device.
Figure 10:
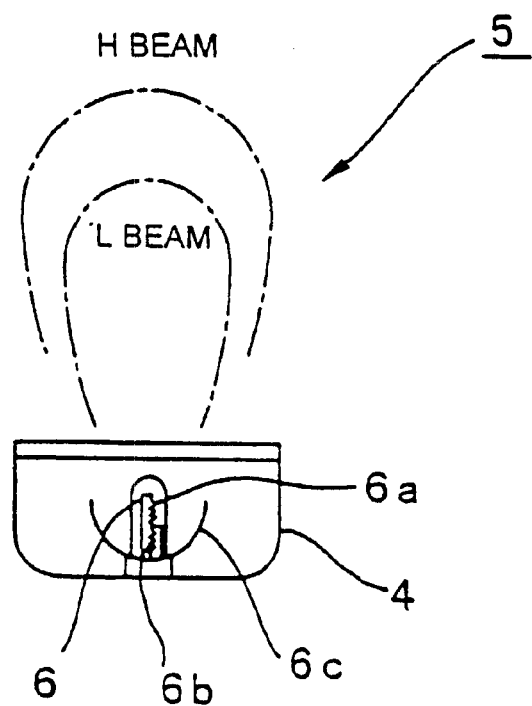
FIG. 10 is a schematic top view of a conventional two-lamp type vehicle headlamp device.
Figure 11:
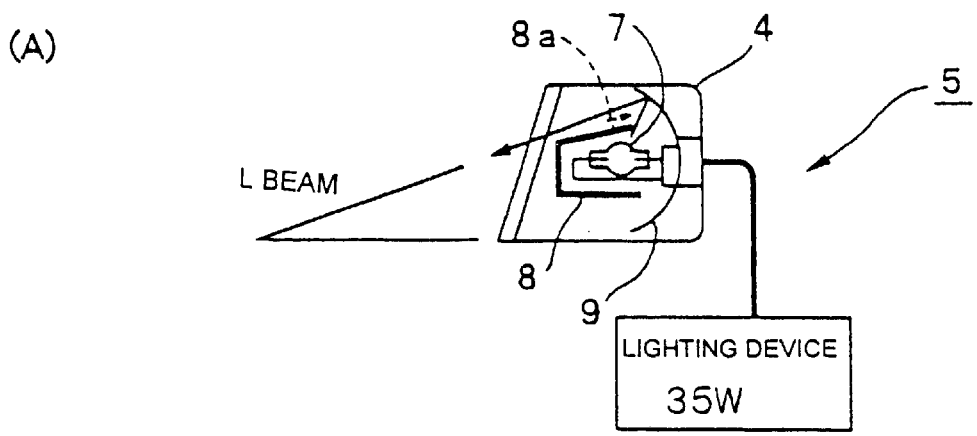
FIGS. 11A–B are schematic side views of the conventional headlamp device of FIG. 10 in L beam mode and H beam mode, respectively.
Figure 11:
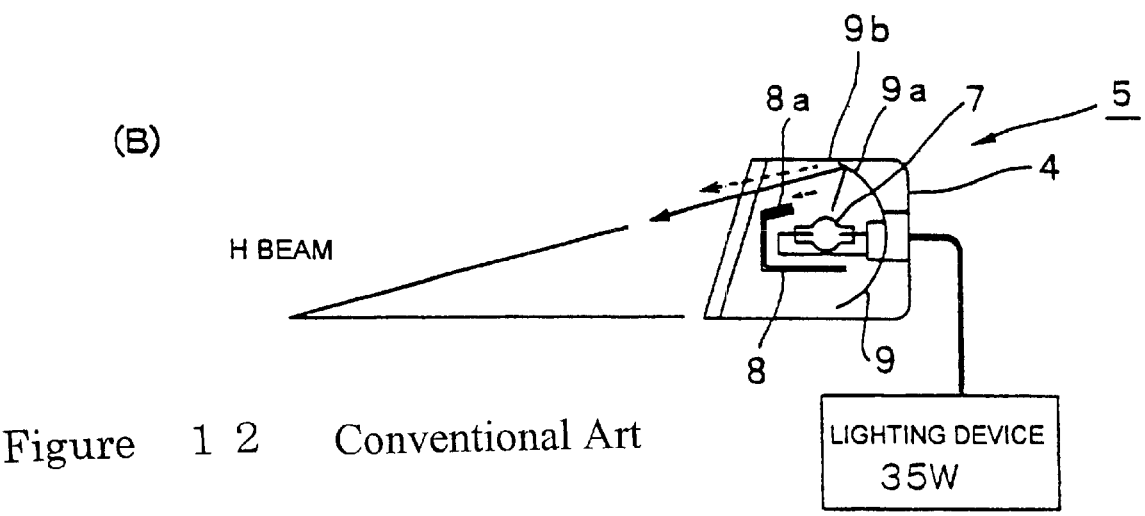
Figure 12:
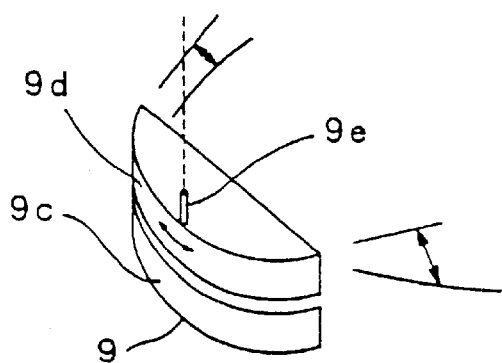
FIG. 12 is a schematic perspective view of one example of the light distribution switching mechanism in the vehicle headlamp device shown in FIG. 10.

As a result, the discharge lamp 11 is lit with a higher brightness by the electric power exceeding the rated electric power. Furthermore, a portion of the light from the discharge lamp 11 is reflected forward by the lower part of the reflective member 14, while another portion of the light is directed towards the tire direction, which causes the light to have a broadened horizontal light distribution such that the region indicated by shading in FIG. 8A is illuminated. Processing returns to step ST14 after step ST21.

If the rated electric power is supplied to the discharge lamp 11 during cornering, i.e., in cases where the vehicle speed and steering angle exceed specified values so that the upper part 16 of the reflective member 14 is rotated in order to broaden the horizontal light distribution, the forward illumination will drop as the horizontal light distribution is broadened by the pivoting of the upper part 16 of the reflective member 14, as is shown in FIG. 8B. However, the discharge lamp 11 can be caused to emit light more brightly (as shown by the solid line in FIG. 8C) in this instance. The brighter light can be provided by the lighting control circuit 25 which supplies an electric power larger than the rated electric power to the discharge lamp 11, as described above. Accordingly, as a result of the broadening of the area of illumination, the forward illumination is indicated by the solid line in FIG. 8D. The quantity of light in the forward field of vision can be maintained at a level that is acceptable to an operator of the vehicle. Thus, during cornering, good distant visual recognition characteristics can be obtained, and good quantity of light in the forward field of vision can be obtained.

When the speed of the vehicle drops below a specified value, e.g., when the vehicle stops, or when the steering angle drops below a specified value, the drop in the vehicle speed is detected in step ST16, and/or the decrease in the steering angle is detected in step ST17, and the electric power is set at the ordinary electric power in step ST19. Accordingly, the discharge lamp 11 is again lit by the rated electric power (preferably 35 W). As a result, when the vehicle is stopped or running at low speed or traveling substantially straight forward, no increase in the electric power occurs, and battery consumption is inhibited to prevent deterioration in the useful life of the discharge lamp 11.

Thus, in the vehicle headlamp device 10 of the invention, the discharge lamp 11 is supplied with an electric power (preferably 38 W) that is larger than the rated electric power (preferably 35 W) only when 1) the H beam is placed in use by the hood 13 used as the means for switching between L beam and H beam, or 2) the horizontal light distribution is broadened by the reflective member 14 used as the means for changing light distribution. As a result, the discharge lamp 11 is lit by a greater quantity of light during use of the H beam and during cornering, so that the quantity of light during use of the H beam or during cornering can be maintained throughout the entire expanded field of vision and good distant visual recognition characteristics can be obtained. Thus, an operator of the vehicle can be comfortable because a good quantity of light in the forward field of vision is obtained.

In the embodiment of the invention described above, a two-lamp type vehicle headlamp device was described. However, the invention is not limited to such a configuration. For example, it is also possible to apply the principles of the invention to a four-lamp type vehicle headlamp device in which respective pairs of discharge lamps are installed on the left and right sides of a vehicle. In this case, two pairs of discharge lamps are utilized, and the discharge lamps used for the H beam receive an increase in electric power during use of the H beam, while the discharge lamps used for L beam receive an increase in electric power during cornering.

As described above, a hood 13 can be used as the means for switching between L beam and H beam for switching between the H beam and the L beam, and a reflective member 14 can be employed as the means for changing light distribution used to broaden the horizontal light distribution. However, the invention is not limited to such means. It is possible to apply the principles of the invention to vehicle headlamp devices using other mechanisms for the means for switching between L beam and H beam and means for changing light distribution. For example, the means for switching between L beam and H beam can include a device that rotates the entire light housing to switch between L beam and H beam modes. Alternatively, additional lights can be installed and selectively operated to provide a means for switching between L beam and H beam. With respect to the means for changing light distribution, a secondary light source that is directed different from a first light source can comprise the means for changing light distribution.

Furthermore, in the embodiment of the invention described above, the lighting control circuit 25 was constructed so that an electric power larger than the rated electric power was supplied to the discharge lamp 11 when the steering angle exceeded a specified value, i.e., when an H level light distribution switching control signal was input from the microcomputer 26 via the D/A converter. However, the invention is not limited to such an arrangement. It is also possible to cause a gradual increase in the electric power supplied to the discharge lamp 11 in accordance with the steering angle as indicated by the dotted line in FIG. 8C. In this case, as shown in FIG. 8D, the amount of fluctuation that occurs in the illumination of the forward field of vision is reduced when the steering angle varies, and a smoother transition and better feeling in terms of the quantity of light in the forward field of vision can be obtained.

Furthermore, in the embodiment of the invention described above, a discharge lamp with a rated electric power of 35 W was used as a light source, and an electric power of 38 W was supplied during the use of the H beam. However, the invention is not limited to such an arrangement. It is also possible to use a discharge lamp with a different rated electric power, and to supply an electric power that is increased by a maximum of approximately 5–20% over the rated electric power during H beam use and cornering.

In the invention, as was described above, a discharge lamp can be supplied with a larger electric power when the horizontal light distribution has been broadened by the means for changing light distribution. Accordingly, the discharge lamp is lit by a larger quantity of light when the horizontal light distribution is broadened, so that any insufficiency in the quantity of light in the forward field of vision that may occur when the horizontal light distribution is broadened is compensated for. Accordingly, good distant visual recognition characteristics can be obtained, and a good feeling in terms of the quantity of light in the forward field of vision can be obtained.

The invention makes it possible to provide, at low cost, a superior vehicle headlamp device which is designed so that the quantity of light in the forward field of vision can be maintained when a portion of the light from the light source is distributed in the traveling direction of the vehicle during cornering.

What is claimed is:

1. A vehicle headlamp device for connection to a vehicle, comprising:

a light source connectable to a front of the vehicle and configured to produce a light beam;

means for switching between a high beam and a low beam located adjacent to said light source;

means for broadening a horizontal light distribution of said light beam in a direction of travel of the vehicle during cornering, said means for broadening a horizontal light distribution located adjacent said light source; and a lighting device configured to receive a vehicle speed detection signal and a steering angle detection signal, said lighting device controlling electric power to said light source and said means for broadening a horizontal light distribution, such that electric power supplied to said light source increases, and said horizontal light distribution is broadened in the direction of travel of the vehicle, when the vehicle speed detection signal and the steering angle detection signal exceed predetermined values.

2. The vehicle headlamp device of claim 1, wherein said lighting device increases said electric power in synchronization with operation of said means for broadening a horizontal light distribution.

3. The vehicle headlamp device of claim 1, wherein said means for broadening a horizontal light distribution is constructed such that said light distribution is maximally broadened when said steering angle detection signal exceeds a predetermined maximum value, and said increase in electric power effected by said lighting device is performed at a constant rate of increase when said steering angle detection signal exceeds said predetermined value.

4. The vehicle headlamp device of claim 1, wherein said means for broadening a horizontal light distribution is constructed such that said light distribution is gradually broadened in accordance with the steering angle detection signal, and said lighting device is configured to control the electric power to gradually increase in accordance with the steering angle detection signal.

5. The vehicle headlamp device of claim 1, wherein said lighting device returns said electric power to its original value when the vehicle speed detection signal drops below a predetermined low value.

6. The vehicle headlamp device of claim 1, wherein said lighting device is controlled such that the electric power supplied to said light source is increased when said light beam is switched to high beam by said means for switching between high beam and low beam.

7. The vehicle headlamp device of claim 6, wherein said lighting device includes a microcomputer which increases the electric power of said lighting device based on one of: 1) the vehicle speed detection signal; 2) the steering angle detection signal; 3) a beam switching command signal emitted from said means for switching between high and low beam; and 4) a combination of the vehicle speed detection signal, the steering angle detection signal and the beam switching command signal.

8. The vehicle headlamp device of claim 1, wherein said increase in electric power effected by said lighting device is approximately a 5% to 20% increase.

9. The vehicle headlamp device of claim 1, wherein the device is constructed as a two-lamp system in which said light source is configured for placement on the right front side of the vehicle and a second left light source is configured for placement on the left front side of the vehicle.

10. The vehicle headlamp device of claim 1, further comprising:

a first left light source configured for placement on the left front of the vehicle;

a second left light source configured for placement on the left front of the vehicle;

a second right light source configured for placement on the right front of the vehicle, wherein said light source is configured for placement on the right front of the vehicle and the vehicle headlamp device is constructed as a four-lamp system.

11. The vehicle headlamp device of claim 1, wherein said light source is a discharge lamp.

12. The vehicle headlamp device of claim 1, further comprising:

a vehicle speed detector for detecting the speed of the vehicle; and a vehicle steering angle detector for detecting the steering angle of the vehicle.

13. The vehicle headlamp device of claim 1, wherein said means for switching between a high beam and a low beam includes a moveable hood positioned adjacent said light source.

14. The vehicle headlamp device of claim 1, wherein said means for broadening a horizontal light distribution includes a reflective member that is split into an upper portion and a lower portion in a horizontal direction, and said upper portion connected to rotate with respect to said lower portion such that said upper portion can reflect light in a different direction as compared to said lower portion.

15. A vehicle headlamp device for connection to a vehicle, comprising:

a light source connectable to a front of the vehicle;

a vertical light directing structure located adjacent said light source and configured to direct a light beam emitted from said light source in one of a low beam direction in which said light beam is directed away from the front of the vehicle, and a high beam direction in which said light beam is directed away from the front of the vehicle and at a higher vertical angle relative to said low beam direction;

a horizontal light directing structure located adjacent said light source and configured to direct a light beam emitted from said light source in one of a normal beam direction in which said light beam is directed away from the front of the vehicle, and a wide beam direction in which said light beam is directed away from the front of the vehicle and at a larger horizontal angle relative to said low beam direction; and a lighting device configured to receive a vehicle steering angle signal and a vehicle speed signal, and to increase electric power to said light source when the vehicle speed signal and steering angle signal exceed predetermined values.

16. The vehicle headlamp device of claim 15, wherein said lighting device increases electric power in synchronization with operation of said vertical light directing structure.

17. The vehicle headlamp device of claim 15, wherein said horizontal light directing structure is controlled by said lighting device such that a horizontal light distribution is maximally broadened when the steering angle signal exceeds a predetermined maximum value.

18. The vehicle headlamp device of claim 15, wherein said increase in electric power effected by said lighting device is performed at a constant rate of increase when the steering angle exceeds said predetermined value.

19. The vehicle headlamp device of claim 15, wherein said horizontal light directing structure is controlled by said lighting device such that a horizontal distribution of light is gradually broadened in accordance with the detected steering angle signal, and said increase in electric power is controlled by said lighting device such that electric power is gradually increased in accordance with the detected steering angle signal.

20. The vehicle headlamp device of claim 15, wherein said lighting device returns the electric power to its original value when the detected vehicle speed signal drops below a predetermined low value.

21. The vehicle headlamp device of claim 15, further comprising:

a high beam/low beam switch, wherein said lighting device increases electric power supplied to said light source when said light beam is switched to high beam by said high beam/low beam switch.

22. The vehicle headlamp device of claim 21, wherein said lighting device includes a microcomputer which increases electric power of said lighting device based on one of: 1) the detected vehicle speed signal; 2) the detected steering angle signal; 3) a beam switching command signal emitted from said high beam/low beam switch; and 4) a combination of the detected vehicle speed signal, the detected steering angle signal and the beam switching command signal.

23. The vehicle headlamp device of claim 15, wherein the increase in electric power effected by said lighting device is approximately a 5% to 20% increase.

24. The vehicle headlamp device of claim 15, wherein the device is constructed as a two-lamp system in which said light source is configured for placement on the right front side of the vehicle and a second left light source is configured for placement on the left front side of the vehicle.

25. The vehicle headlamp device of claim 15, further comprising:
a first left light source configured for placement on the left front of the vehicle;
a second left light source configured for placement on the left front of the vehicle;
a second right light source configured for placement on the right front of the vehicle,
wherein said light source is configured for placement on the right front of the vehicle and the vehicle headlamp device is constructed as a four-lamp system.

26. The vehicle headlamp device of claim 15, wherein said light source is a discharge lamp.

27. The vehicle headlamp device of claim 15, further comprising:

a vehicle speed detector for detecting the speed of the vehicle and outputting said speed signal to said lighting device; and
a vehicle steering angle detector for detecting the steering angle of the vehicle connected to said lighting device and outputting said steering angle signal to said lighting device.

28. The vehicle headlamp device of claim 15, wherein said vertical light directing structure includes a moveable hood positioned adjacent said light source.

29. The vehicle headlamp device of claim 15, wherein said horizontal light directing structure includes a reflective member that is split into an upper portion and a lower portion in a horizontal direction, and said upper portion connected to rotate with respect to said lower portion such that said upper portion can reflect light in a different direction as compared to said lower portion.

30. A method of controlling illumination of a headlamp in a vehicle, the headlamp having a light source including light directing structures proximate the headlamp, the method comprising:
sensing at least one of a vehicle speed signal and a vehicle steering signal;
supplying electric power to the lightsource at a predetermined electric power; and
increasing electric power to the lightsource whenever the vehicle speed signal and vehicle steering signal reach predetermined values.

31. The method as claimed in claim 30, further comprising reducing the electric power to the light source whenever one of the vehicle speed signal and vehicle steering signal is not greater than the predetermined values.

* * * * *